(12) United States Patent
Hovsepian et al.

(10) Patent No.: US 7,621,499 B2
(45) Date of Patent: Nov. 24, 2009

(54) ADJUSTABLE MOUSE LAP PAD

(76) Inventors: Alex Hovsepian, 258 Berger Ave., Oakhurst, NJ (US) 07755; Justin Hovsepian, 258 Berger Ave., Oakhurst, NJ (US) 07755

( * ) Notice: Subject to any disclaimer, the term of this patent is extended or adjusted under 35 U.S.C. 154(b) by 211 days.

(21) Appl. No.: 11/973,414

(22) Filed: Oct. 9, 2007

(65) Prior Publication Data

US 2009/0090838 A1    Apr. 9, 2009

(51) Int. Cl.
*A47B 91/00* (2006.01)
(52) U.S. Cl. .............. 248/346.04; 248/346.06; 248/346.07; 108/43
(58) Field of Classification Search ........... 248/346.04, 248/346.01, 220.21, 220.22, 223.31, 222.13, 248/229.11, 229.12, 229.21, 229.22, 228.2, 248/228.3, 230.1, 230.2, 678, 230.3, 231.31, 248/231.41, 274.1, 292.1, 292.12, 574, 346.06, 248/346.07; 108/43, 42, 137, 143; 312/223.2; 224/222
See application file for complete search history.

(56) References Cited

U.S. PATENT DOCUMENTS 5,593,128 A * 1/1997 Odom et al. ........... 248/346.01
5,937,765 A * 8/1999 Stirling .................. 108/43
6,496,360 B1 * 12/2002 Cordes et al. .......... 361/679.09
6,511,039 B1 * 1/2003 Nash ..................... 248/678
6,663,072 B1 * 12/2003 Ritchey et al. ......... 248/444
7,533,618 B2 * 5/2009 Thomason ............. 108/42

* cited by examiner

*Primary Examiner*—J. Allen Shriver
*Assistant Examiner*—Todd M. Epps
(74) *Attorney, Agent, or Firm*—Stuart M. Goldstein

(57) ABSTRACT

An adjustable mouse lap pad has a working platform with flat upper and lower surfaces. Two sets of dual tracks are secured to the lower surface, each track set having two track members with teeth. Four pad supporting saddle elements are configured for comfortable placement on the lap of the user. The saddle elements are positioned within the sets of tracks. Each saddle element has teeth which engage with the teeth of the track members. The saddle elements are biasedly controlled, by push button activation, to move along the tracks and, at desired locations on the lower surface, to be locked in position within the teeth of the track members. This securely maintains the saddle elements under the platform, eliminating unwanted shifting and movement while the pad is on the thigh or lap of the user.

20 Claims, 5 Drawing Sheets

ADJUSTABLE MOUSE LAP PAD

BACKGROUND OF THE INVENTION

There are a variety of different types of pad and platform surfaces which are designed to allow efficient operation of a computer mouse. Of course, these surfaces all must be smooth and flat and so the standard mouse pad provides the most commonly used operating surface. However, a mouse pad is routinely used on a desk or table, which results in the computer operator being restricted to a single position, usually seated, behind that desk or table. Therefore, an operator will be required to remain in the same position, often for long periods of time, while operating the mouse and using the computer. Such prolonged repetitive operation can cause physical problems for the operator. The comfort factor in working at the computer is also compromised.

The introduction of mouse lap pads was an attempt to remedy these problems. Placement of such pads on the thigh or lap allows the operator freedom of movement while using the mouse, as well as the ability to change physical positions. There are a number of existing lap supported mouse pads. For example, U.S. Pat. No. 5,593,128 discloses a representative example of a working mouse surface lap pad which has lower platform support elements which are adjustable to the width of the lap of the user. However, this lap pad, and others which are similar, are not designed to maintain the pad securely on the lap of the user. While certain pads have means for lap adjustments, these fail to hold the pad firmly in place, without undue movement. Many such pads also do not have any means to ensure that their adjustable support elements remain in position during use.

SUMMARY OF THE INVENTION

It is thus the object of the present invention to provide an adjustable mouse lap pad which overcomes the disadvantages and limitations of prior pads. It is an object of the present invention to provide an adjustable mouse lap pad which firmly holds the pad tight on the lap of the user.

It is another object of the present invention to provide an adjustable mouse lap pad which is readily adjustable, based on the size of the user's thigh or lap.

It is still another object of the present invention to provide an adjustable mouse lap pad which has a locking system which secures the adjustment of the pad in place, once the adjustment is set in position.

It is a further object of the present invention to provide an adjustable mouse lap pad which permits lockable adjustment of the pad in a variety of different positions.

It is still another object of the present invention to provide an adjustable mouse lap pad which allows the position of the pad's support elements to easily and simply be changed.

These and other objections are accomplished by the present invention, an adjustable mouse lap pad with a working platform with flat upper and lower surfaces. Two sets of dual tracks are secured to the lower surface, each track set having two track members with teeth. Four pad supporting saddle elements are configured for comfortable placement on the lap of the user. The saddle elements are positioned within the sets of tracks. Each saddle element has teeth which engage with the teeth of the track members. The saddle elements are biasedly controlled, by push button activation, to move along the tracks and, at desired locations on the lower surface, to be locked in position within the teeth of the track members. This securely maintains the saddle elements under the platform, eliminating unwanted shifting and movement while the pad is on the thigh or lap of the user.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
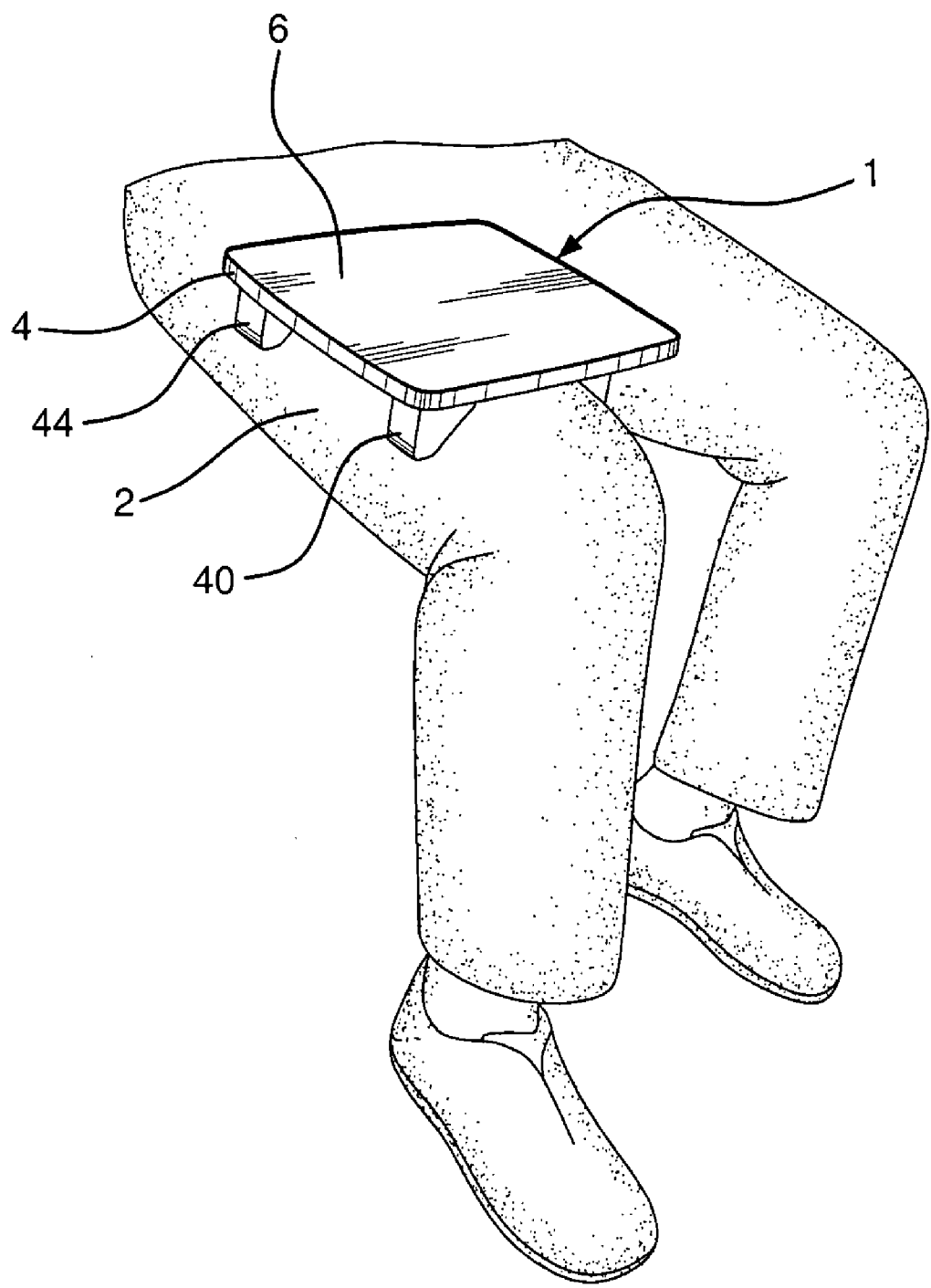
FIG. 1 shows the mouse pad of the present invention in use on the thigh or leg of the operator.

The adjustable mouse lap pad of the present invention 1 shown on the lap or thigh of user 2 in FIG. 1, comprises flat working platform 4 with smooth upper surface 6 and lower surface 8. Mounted on lower surface 8 are platform supporting components comprising two sets of parallel extending tracks 10 and 12. Track set 10 comprises track members 14 and 16 and track set 12 comprises track members 18 and 20. Track members 14, 16, 18 and 20 each have a plurality of teeth 22, 24, 26 and 28 respectively. As can best be seen in FIG. 2, teeth 22 extend inward towards track member 16, teeth 24 extend inward towards track member 14, teeth 26 extend inward towards track member 20 and teeth 28 extend inward towards track member 18. Running parallel to each sets of tracks 10 and 12 are guide rails 30, 32, 34 and 36, respectively.

Figure 3:
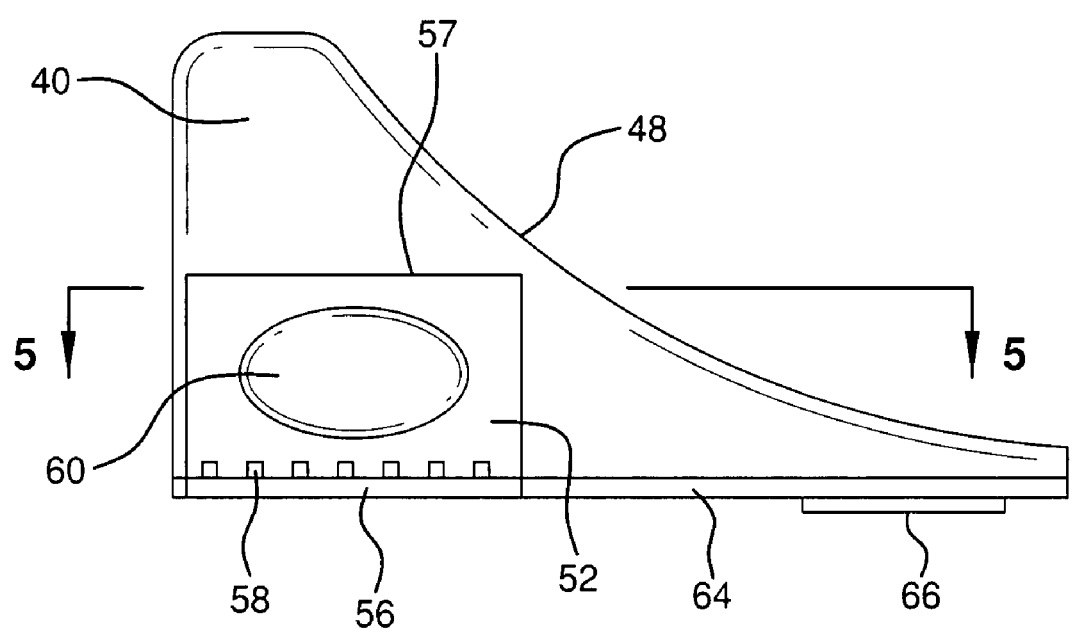
FIG. 3 is an elevation view of the saddle element of the present invention.
Figure 4:
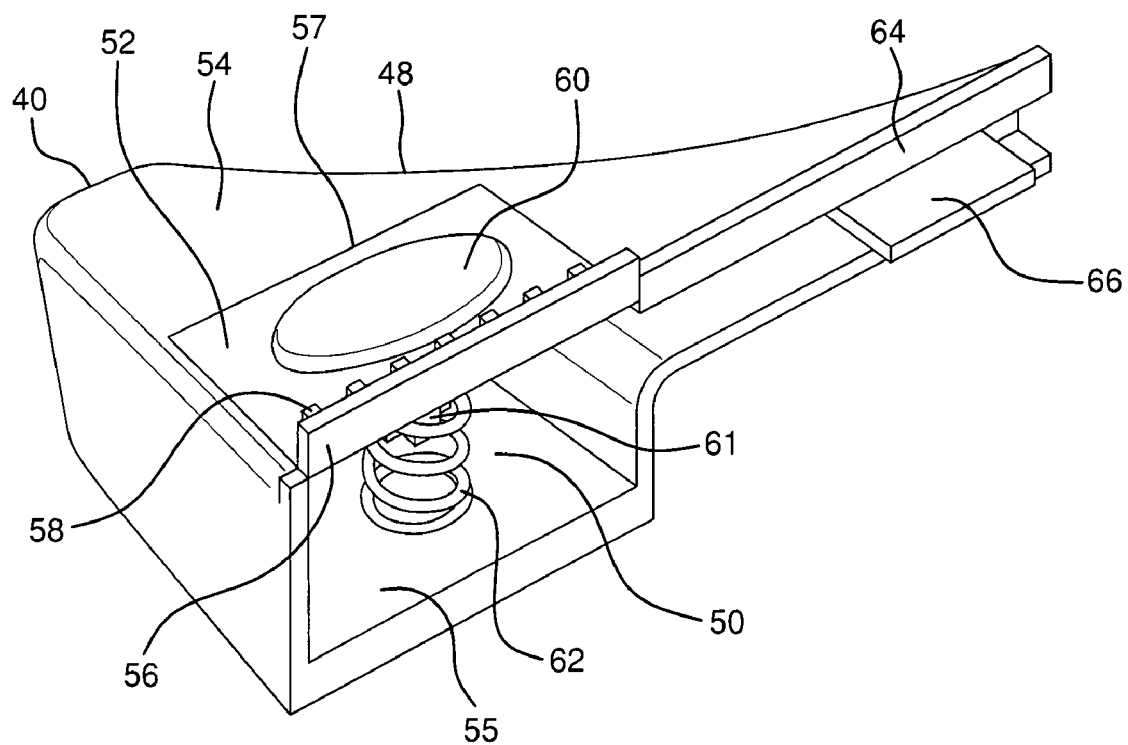
FIG. 4 is an isometric, underside view of the saddle element of the present invention.
Figure 5:
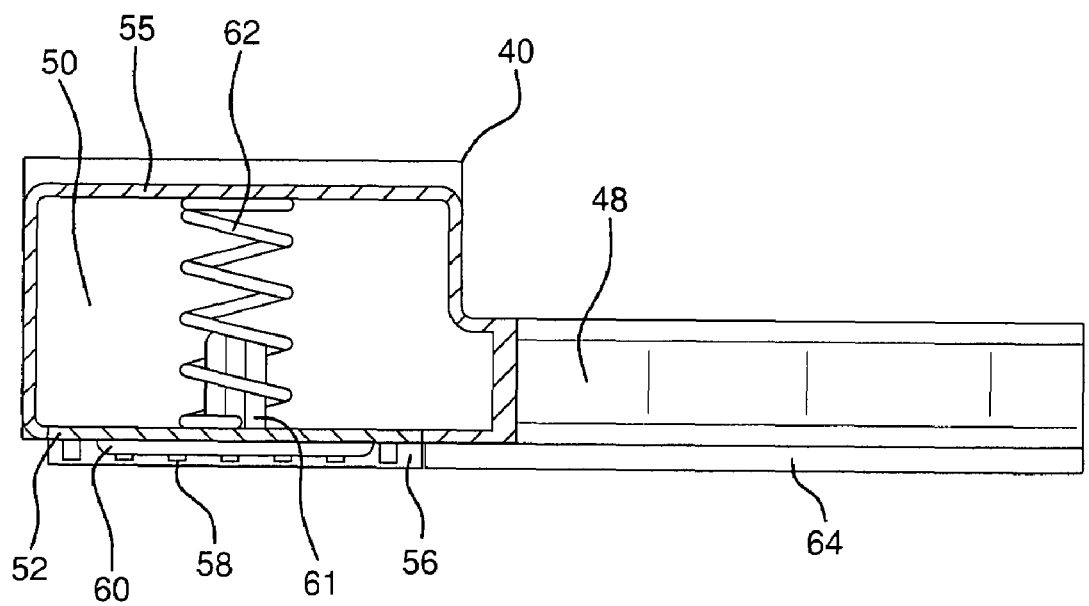
FIG. 5 is a cross-sectional view, taken from FIG. 3.

Also forming part of the platform support of the invention and mounted between track members 14 and 16 of track set 10 are pad supporting saddle elements 40 and 42 and between track members 18 and 20 of track set 12 are saddle elements 44 and 46. Each of these saddle elements are identical in configuration. It is anticipated that they will be made of a hard, yet flexible molded plastic material. As best seen in FIGS. 3 and 4, with regard to saddle element 40 cited as an example, the saddle element has a curved outer surface 48 configured to extend comfortably over the thigh of the user. Saddle element 40 comprises interior space 50, the element being open and hollow below surface 48, as seen in FIG. 4. Saddle element 40 also comprises biasedly controlled outer wall section 52, which fits snugly within and is pivotally mounted to side wall 54 of the saddle element. Wall section 52 is connected to side wall 54 and is pivotally moveable thereto at its upper edge 57. It is contemplated that wall section 52 could initially be manufactured as part of sidewall 54. Lateral cuts would be made along the sides of wall section 52, so that the wall section has limited, pivotable movement at its upper edge 57.

Outer section wall 52 comprises lip portion 56 on which teeth 58 are located. Actuating push button 60 is extends out from wall section 52. Spring support arm 61 extends from the internal surface of wall section 52 into space 50. One end of biasing spring 62 circumscribes arm 61. Spring 62 extends between the internal surface of outer wall section 52, through interior surface 50 to inner wall 55 of saddle element 40. Spring 62 is configured and designed to extend and maintain wall section 52 and its lip 56 a small distance past lip 64 of saddle element 40, as best seen in FIG. 4. When button 60 is pushed, wall section 52 acts against the bias of spring 62 and the wall section is compelled inward, thereby aligning lip 56 with lip 64. Guide tab 66 extends downwardly from a bottom surface of saddle element 40. As noted above, all four saddle elements 40, 42, 44 and 46 are identical in configuration.

Figure 2:
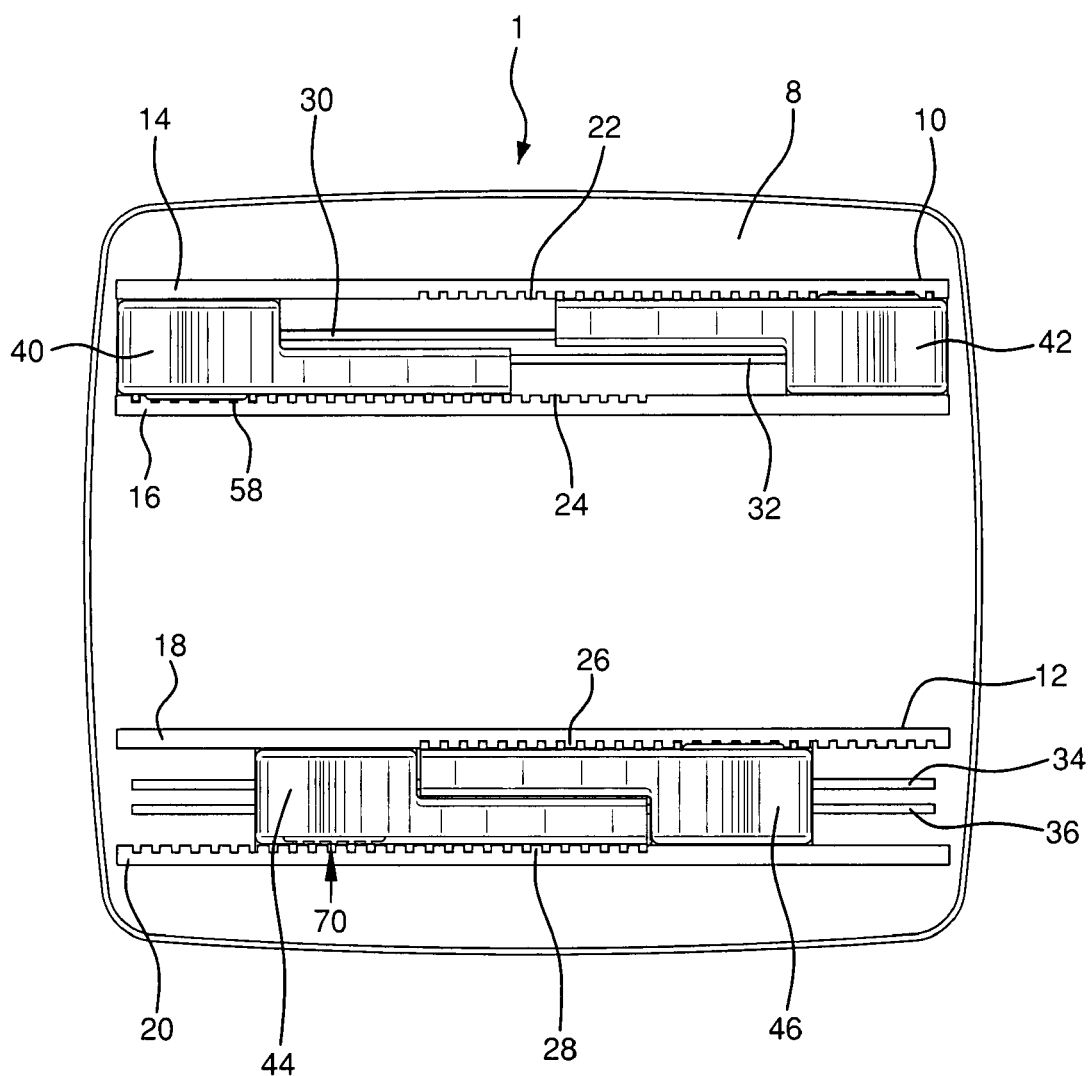
FIG. 2 is a top, plan view of the mouse pad of the present invention.

In use, saddle elements 40, 42, 44, and 46 are positioned, as shown in FIG. 2, adjacent to track members 16, 14, 20, and 18, respectively, and over guide rails 30, 32, 34, and 36, such that teeth 58, shown with regard to saddle element 40 as an example, mesh with and are engaged with teeth 24 of track member 16. Guide tab 66 of saddle element 40 is positioned adjacent to guide rail 32 to maintain the saddle element in a straight path, substantially parallel to track member 16. Saddle elements 42, 44, and 46 are similarly positioned adjacent so that their teeth mesh with and are engaged between track teeth 22, 28, and 26, respectively.

When saddle elements 40, 42, 44, and 46 are so positioned with their teeth meshed and engaged with the teeth of track teeth 24, 22, 28 and 26, lip 56 of saddle element 40, as an example, is extended outward from lip 64, thus locking the saddle element in position under platform 4. Movement of saddle elements 40, 42, 44, and 46 is accomplished by pushing each of their respective push buttons inward, as designated by 70 in FIG. 2. For example pushing button 60 of saddle element 40 compels wall section 52 against the bias of spring 62. Wall section 52 then pivots slightly inward around edge 57, aligning lips 56 and 64. This disengages track teeth 24 from teeth 58 of saddle element 40. Saddle element 40 is then free to be adjustably slid over lower surface 8, with guide tab 66 in contact with guide rail 32, ensuring that the saddle element maintains a substantially straight course. When the desired adjustment of saddle element 40 has been made, button 60 is released. Spring 62 then compels wall section 52 outward, again permitting saddle element teeth 58 to mesh and engage track teeth 24, thereby locking saddle element 40 in position. Adjustment of all other saddle elements 42, 44 and 46 are accomplished in this same manner, in order to properly size lap pad 1 to the lap or thigh of the user.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An adjustable mouse lap pad comprising:
    a substantially flat platform with smooth upper and lower surfaces;
    first platform support means attached to the lower surface of the platform for maintaining the platform on the lap of a user, said support means comprising a first set of saddle elements slideably moveable along a first pair of track members, and means to lock the saddle elements in a plurality of positions between the track members, said saddle elements each further comprising bias control means to initiate movement of the saddle elements along the track members; and
    second platform support means attached to the lower surface of the platform for maintaining the platform on the lap of a user, said second support means comprising a second set of saddle elements slideably moveable along a second pair of track members, and adjustable engagement means to lock the saddle elements in a plurality of positions between the track members, said saddle elements each further comprising bias control means to initiate movement of the saddle elements along the track members.

2. The adjustable mouse lap pad as in claim 1 further comprising guide rails extending parallel to the first and second pair of the track members.

3. The adjustable mouse lap pad as in claim 1 wherein the adjustable engagement means to lock the elements of the first and second platform support means comprises teeth extending from the first and second pair of track members and teeth extending from the first and second sets of saddle elements, the teeth of the first set of saddle elements configured to engage and mesh with the teeth of the first pair of track members and the teeth of the second set of saddle elements configured to engage and mesh with teeth of the second pair of track members, whereby when the teeth of the track members and the teeth of the saddle elements are engaged, the saddle elements are locked beneath the lower surface of the platform.

4. The adjustable mouse lap pad as in claim 1 wherein the control means comprises a biasedly controlled push actuated button located on each of the saddle elements.

5. The adjustable mouse lap pad as in claim 4 wherein the control means further comprises a spring member located within each of the saddle elements.

6. The adjustable mouse lap pad as in claim 1 wherein the control means comprises a spring member located in each of the saddle elements.

7. An adjustable mouse lap pad comprising:
    a substantially flat platform with smooth upper and lower surfaces;
    parallel extending track members;
    a plurality of saddle elements slideably moveable along the track members, each of the saddle elements having bias control means to initiate movement of the saddle elements along the track members; and
    adjustable engagement means to lock the saddle elements in a plurality of positions on the track members.

8. The adjustable mouse lap pad as in claim 1 further comprising guide means attached to the lower surface to maintain the saddle elements in a path substantially parallel to the track members.

9. The adjustable lap pad as in claim 1 comprising two pairs of track members and two sets of saddle elements.

10. The adjustable lap pad as in claim 7 wherein the adjustable engagement means to lock comprises teeth extending from the track members and teeth extending from the saddle elements, the teeth of the saddle elements configured to engage and mesh with the teeth of the track members, whereby when the teeth of the saddle elements and the teeth of the track members are engaged, the saddle elements are locked beneath the lower surface of the platform.

11. The adjustable lap pad as in claim 7 wherein the control means comprises a biasedly controlled push actuated button located on each of the saddle elements.

12. The adjustable lap pad as in claim 11 wherein the control means further comprises a spring member located in each of the saddle elements.

13. The adjustable lap pad as in claim 7 wherein the control means comprises a spring member located in each of the saddle elements.

14. An adjustable mouse lap pad comprising:
    a substantially flat platform with smooth upper and lower surfaces;
    a first set of tracks attached to the lower surface;
    two saddle elements slideably mounted within the first set of tracks, said saddle elements each comprising bias control means to initiate movement of the saddle elements along the first set of tracks;

a second set of tracks attached to the lower surface;

two saddle elements slideably mounted within the second set of tracks, said saddle elements each comprising bias controlled means to initiate movement of the saddle elements along the second set of tracks; and adjustable engagement means to lock each saddle element in a plurality of positions within their respective set of tracks.

15. The adjustable mouse lap pad as in claim 14 further comprising guide means attached to the lower surface to maintain the saddle elements in a path substantially parallel to the sets of tracks.

16. The adjustable lap pad as in claim 14 wherein the first set of tracks comprises two track members and the second set of tracks comprises two track members.

17. The adjustable lap pad as in claim 14 wherein the adjustable engagement means to lock comprises teeth extending from the first and second sets of tracks and teeth extending from the saddle elements, the teeth of the saddle elements configured to engage and mesh with the teeth of the first and second sets of tracks, whereby when the teeth of the saddle elements and the teeth of the sets of tracks are engaged, the saddle elements are locked beneath the lower surface of the platform.

18. The adjustable lap pad as in claim 14 wherein the control means comprises a biasedly controlled push actuated button located on each of the saddle elements.

19. The adjustable lap pad as in claim 18 wherein the control means further comprises a spring member located in each of the saddle elements.

20. The adjustable lap pad as in claim 14 wherein the control means comprises a spring member located in each of the saddle elements.

\* \* \* \* \*